United States Patent
Wille et al.

[11] Patent Number: 6,002,685
[45] Date of Patent: Dec. 14, 1999

[54] TIME SLOT INTERCHANGER AND DIGITAL COMMUNICATIONS TERMINAL FOR ISDN D-CHANNEL ASSEMBLY

[75] Inventors: David G. Wille, Plano, Tex.; Kay B. Magleby, Coolin, Id.

[73] Assignee: Alcatel USA Sourcing, L.P., Plano, Tex.

[21] Appl. No.: 08/754,000

[22] Filed: Dec. 4, 1996

[51] Int. Cl.[6] .......................................... H04J 3/00
[52] U.S. Cl. .......................... 370/376; 370/412; 370/474; 370/524
[58] Field of Search ..................... 370/351, 401, 370/524, 530, 264, 265, 378, 381, 376, 377, 379, 476, 522, 375, 420, 419, 474, 219, 220, 228, 229; 379/201, 207, 419

[56] References Cited

U.S. PATENT DOCUMENTS

| | | | |
|---|---|---|---|
| 3,740,483 | 6/1973 | Pedersen | 370/376 |
| 5,157,656 | 10/1992 | Turudic et al. | 370/379 |
| 5,283,782 | 2/1994 | Takase et al. | 370/219 |
| 5,640,387 | 6/1997 | Takahashi et al. | 370/376 |

OTHER PUBLICATIONS

M.J.M. Forbes et al. Integrated Access: The Achievement of a Vision, IEEE 2081–2086, 1991.
Arvidson et al, A Generic Digital Switch Interface (TR–303) For Local Access, IEEE 2087–2091, 1991.
Kim et al, Flexibilty and Quality in the Access Network, IEEE 1864–1868, 1992.
Bellcore Information, Bellcore: GR–303 Integrated Access Platforms, Mar. 3, 1998.

*Primary Examiner*—Melvin Marcelo
*Assistant Examiner*—Jasper Kwoh
*Attorney, Agent, or Firm*—Baker & Botts, L.L.P.

[57] ABSTRACT

The invention comprises a time slot interchanger and method for multiplexing ISDN D-channel signals into multiplexed signals in a digital communications terminal. The method comprises receiving a frame of communication signals wherein some of the communication signals represent ISDN D-channel signals wherein each ISDN D-channel signal is represented by a first number of data bits and a second number of other bits. A first copy of the frame of communication signals is stored in a first memory while a second copy of the frame of communication signals is stored in a second memory during a first frame period. During a second frame period, at least some of the stored communication signals are retrieved from the first memory and at least some of the stored communication signals are retrieved from the second memory. Multiplexed signals are then assembled wherein at least one multiplexed signal comprises a multiplexed combination of the data bits of ISDN D-channel signals retrieved from the first and second memories.

23 Claims, 3 Drawing Sheets

TIME SLOT INTERCHANGER AND DIGITAL COMMUNICATIONS TERMINAL FOR ISDN D-CHANNEL ASSEMBLY

CROSS REFERENCE TO RELATED APPLICATIONS

This application is related to U.S. application Ser. No. 08/759,390, filed on Dec. 4, 1996 by David G. Wille, et al., now U.S. Pat. No. 5,905,734, and entitled, "Time Slot Interchanger and Digital Communications Terminal for ISDN D-Channel Assembly".

This application is related to U.S. application Ser. No. 08/759,187, filed on Dec. 4, 1996 by David G. Wille, et al., now U.S. Pat. No. 5,883,402, and entitled, "Time Slot Interchanger and Digital Communications Terminal for ISDN D-Channel Assembly".

This application is related to U.S. application Ser. No. 08/759,391, filed on Dec. 4, 1996 by David G. Wille, now U.S. Pat. No. 5,905,735, and entitled, "Time Slot Interchanger and Digital Communications Terminal for ISDN D-Channel Assembly".

TECHNICAL FIELD OF THE INVENTION

This invention relates generally to telecommunications and more particularly to a method and apparatus for multiplexing ISDN D-channel signals in a digital communications terminal.

BACKGROUND OF THE INVENTION

Bellcore has developed a series of requirements for telecommunications equipment manufacturers to follow when interfacing a digital loop carrier with a class V central office switch. These requirements are collected in Bellcore document TR-303.

One of the optional requirements of TR-303 concerns assembly of a plurality of Integrated Services Digital Network (ISDN) D-channel signals into a single DS0 signal. This option of TR-303 now requires that up to four ISDN D-channel signals be multiplexed together to form a single DS0 signal for transport from a digital loop carrier to a class V central office switch. The regional bell operating companies now require that this option be made available.

An ISDN signal comprises two B-channel and one D-channel signal. Each B-channel signal comprises an 8-bit signal while the D-channel signal comprises a 2-bit signal. Because the 8-bit DS0 signal has been the traditional base unit of transport for the telephone system, ISDN D-channel signals often consume an entire 8-bit DS0 signal. Transporting individual D-channel signals in a DS0 signal wastes three-fourths of the bandwidth for that particular DS0.

The optional requirement of TR-303 discussed above seeks to utilize bandwidth more efficiently. In accordance with TR-303, one to four ISDN D-channel signals may be multiplexed together and carried in a single DS0 signal between the digital loop carrier and the central office class V switch. This TR-303 requirement reduces wasted bandwidth between a digital loop carrier and a class V central office switch, particularly where a large number of ISDN lines are connected to the digital loop carrier.

SUMMARY OF THE INVENTION

One aspect of the invention is a method and apparatus for multiplexing ISDN D-channel signals into multiplexed signals. Another aspect of the invention is a digital communications terminal that assembles ISDN D-channel signals in accordance with the method of the invention. The method comprises receiving a frame of communication signals wherein some of the communication signals represent ISDN D-channel signals wherein each ISDN D-channel signal is represented by a first number of data bits and a second number of other bits. A first copy of the frame of communication signals is stored in a first memory while a second copy of the frame of communication signals is stored in a second memory during a first frame period. At least some of the stored communication signals are retrieved from the first memory and the second memory during a second frame period. Multiplexed signals are assembled wherein at least one multiplexed signal comprises a multiplexed combination of the data bits of ISDN D-channel signals retrieved from the first and second memories.

The invention has several important technical advantages. The invention allows a digital loop carrier to meet the requirements of TR-303 for ISDN D-channel assembly. Assembly may be accomplished using the time slot interchanger of the digital loop carrier. The invention may also be used in any type of digital communications terminal. Utilization of a time slot interchanger for D-channel assembly makes efficient use of a digital communications terminal's hardware because the time slot interchanger may also be used in its traditional role as a time slot interchanger. The invention allows the manufacturer of an existing digital loop carrier to easily redesign its time slot interchanger in a time and cost efficient manner in order to meet the requirements of TR-303. The invention achieves multiplexing of D-channel signals without adding additional frames of time delay to the D-channel signals.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1 through 5 of the drawings, like numerals being used for like and corresponding parts of the various drawings.

Figure 1:
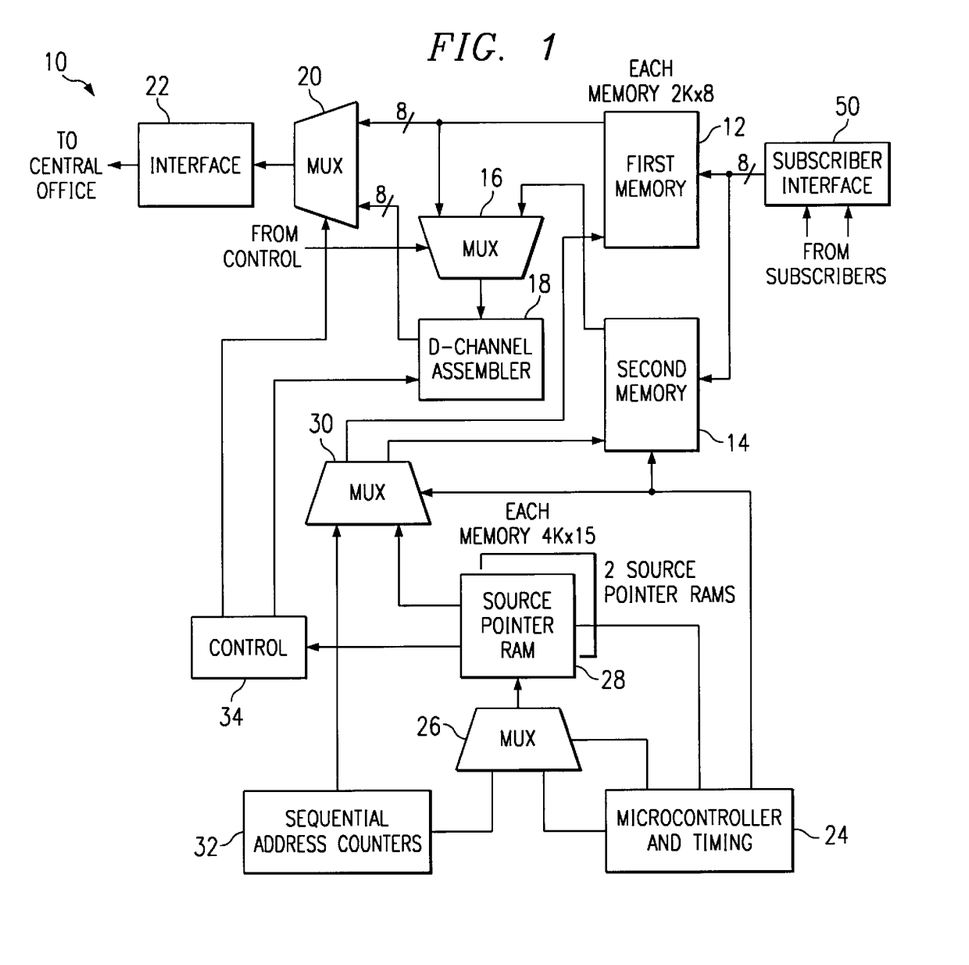
FIG. 1 illustrates a block diagram of a first embodiment of the time slot interchanger portion of a digital communications terminal constructed in accordance with the invention.

FIG. 1 illustrates an embodiment of a time slot interchanger 10 that may be used to multiplex ISDN D-channel signals in accordance with the invention. For purposes of this description, the terms "D-channel" and "1/4 DSO" are used interchangeably and refer to the 2-bit portion of an ISDN signal. Time slot interchanger 10 is capable of performing a time slot interchange function on a plurality of signals received from a subscriber interface and sent to a central office interface. Although this function will not be described in detail, it should be understood that time slot interchanger 10 may perform any function performed by an existing time slot interchanger as well as the functions of the invention. For example, time slot interchanger 10 may employ the power conservation techniques disclosed in U.S. Pat. No. 5,260,937 issued to Thomas R. Eames and Lac Trinh and assigned to DSC Communications Corporation, which is hereby incorporated by reference as if fully set forth herein. Although this example performs assembly of D-channel signals between subscribers and a central office, the invention could be used anywhere in a communications network.

Time slot interchanger 10 comprises first time slot interchanger memory 12, second time slot interchanger memory 14, D-channel assembler 18, multiplexer 16, multiplexer 20, and interface 22. First time slot interchanger memory 12 and second time slot interchanger memory 14, in this example, are 2K by 8 memories which may be used for interchanging over 2,000 DSO communication signals. First time slot interchanger memory 12 and second time slot interchanger memory 14 receives signals from a subscriber interface 50. In this embodiment, DSOs are written into first time slot interchanger memory 12 and second time slot interchanger memory 14 in consecutive order and read out of first time slot interchanger memory 12 and second time slot interchanger memory 14 in random order to achieve the time slot interchange function.

The invention employs dual memory banks, comprising first time slot interchanger memory 12 and second time slot interchanger memory 14 in this embodiment. The use of dual memory banks reduces the speed requirements for first time slot interchanger memory 12 and second time slot interchanger memory 14. While data is being received from the subscribers, two copies may be made, one in each time slot interchanger memory 12, 14. Thus, all subscriber data may be made equally available from both first time slot interchanger memory 12 and second time slot interchanger memory 14. First time slot interchanger memory 12 and second time slot interchanger memory 14 are each associated with their own source pointer RAM 28. The structure of the source pointers used to achieve the time slot interchange function for time slot interchanger 10 will be discussed more fully below.

Some of the signals received from the subscriber interface and written into first time slot interchanger memory 12 and second time slot interchanger memory 14 are ISDN D-channel signals. ISDN D-channel signals are output by first time slot interchanger memory 12 and second time slot interchanger memory 14 and received by D-channel assembler 18. D-channel assembler 18 multiplexes between one and four D-channel signals into a multiplexed DSO signal. Multiplexer 20 feeds either the output of first time slot interchanger memory 12 or D-channel assembler 18 to interface 22. Interface 22 then sends the appropriate signal at the appropriate time to the central office switch. The invention accomplishes the multiplexing of 1/4 DSO signals by reading either one or two D-channel signals from each of first time slot interchanger memory 12 and/or second time slot interchanger memory 14 during a single DSO time slot and sending each D-channel signal to D-channel assembler 18 to be assembled during that time slot. For example, if four D-channel signals were to be multiplexed into a single DSO signal, two would be retrieved from first time slot interchanger memory 12 and two would be retrieved from second time slot interchanger memory 14 during the time slot in question. Thus, time slot interchanger 10 can multiplex D-channel signals into a DSO signal and pass that signal to interface 22 or send a normal DSO signal from first time slot interchanger memory 12 to interface 22 during a time slot.

Multiplexer 16 determines whether D-channel assembler 18 receives its input from either first time slot interchanger memory 12 or second time slot interchanger memory 14. Multiplexer 16 is controlled by signals received from control circuitry 34. To reduce the demands on first time slot interchanger memory 12 and second time slot interchanger memory 14, reads from the memories may be staggered to allow a longer memory access time.

Time slot interchanger 10 also includes control circuitry which controls first time slot interchanger memory 12, second time slot interchanger memory 14, multiplexer 16, D-channel assembler 18, multiplexer 20 and/or interface 22. The control circuitry includes microcontroller and timing circuitry 24, multiplexer 26, source pointer RAMs 28, multiplexer 30, sequential address counters 32 and control circuitry 34.

Microcontroller and timing circuitry 24 oversees the control and timing of time slot interchanger 10. Microcontroller and timing circuitry 24 controls the interchange of time slots utilizing source pointers stored in the appropriate location in source pointer RAMs 28. Multiplexer 26 provides an address to source pointer RAMs 28 either from microcontroller and timing circuitry 24, or from sequential address counters 32. In this embodiment, multiplexer 26 is a dual multiplexer that handles multiplexing for both source pointer RAMs 28. Alternatively, separate multiplexers 26 could be used without departing from the invention. Source pointer RAMs 28 receive their address inputs from microcontroller and timing circuitry 24 when the digital communications terminal is setting up a connection for a particular time slot. Microcontroller and timing circuitry 24 stores the appropriate pointer in source pointer RAM 28. During the operation of time slot interchanger 10, source pointer RAMs 28 receive their address inputs from sequential address counters 32.

First time slot interchanger memory 12 and second time slot interchanger memory 14 receive their address inputs from multiplexer 30. As was the case with multiplexer 26, multiplexer 30 is a dual multiplexer that multiplexes different address lines for first time slot interchanger memory 12 and second time slot interchanger memory 14. Alternatively, a separate multiplexer 30 could be used for each of first time slot interchanger memory 12 and second time slot interchanger memory 14. Multiplexer 30 provides either the output of sequential address counters 32 or source pointer RAMs 28 as the address input to first time slot interchanger memory 12 and second time slot interchanger memory 14. The address for first time slot interchanger memory 12 is received from one of the source pointer RAMs 28 while the address lines for second time slot interchanger memory 14 are received from another source pointer RAM 28. Alternatively, a lesser or greater number of source pointer RAMs 28 could be used without departing from the scope of the invention. Because time slot interchanger 10 comprises a consecutive write/random read time slot interchanger, first time slot interchanger memory 12 and second time slot interchanger memory 14 receive their address inputs from sequential address counters 32 while data is being written to first time slot interchanger memory 12 and second time slot interchanger memory 14 and receive their address inputs from source pointer RAMs 28 when data is being read from first time slot interchanger memory 12 and second time slot interchanger memory 14.

Control circuitry 34 determines whether the output of first time slot interchanger memory 12 or D-channel assembler 18 is passed to interface 22. As will be more fully described below, control circuitry 34 also provides the appropriate control signals to allow assembly of D-channel signals in D-channel assembler 18.

In operation, a digital communications terminal receives each of a series of repetitive frames of communication signals wherein some of the communication signals represent ISDN D-channel signals. A particular frame of communication signals is stored in first time slot interchanger memory 12 and second time slot interchanger memory 14 during a first frame period. First time slot interchanger memory 12 and second time slot interchanger memory 14 receive the frame through a subscriber interface 50. During a second frame period, at least some of the stored communication signals are retrieved from first time slot interchanger memory 12 and/or second time slot interchanger memory 14. In this embodiment, ordinary DS0 signals to be sent to the central office are retrieved during the proper time slot of the second frame and sent directly from first time slot interchanger memory 12 to interface 22 through multiplexer 20. Multiplexer 20 will pass the output of first time slot interchanger memory 12 to interface 22 when the particular time slot in question is to contain an ordinary DS0 signal.

To assemble up to four D-channel signals into a single DS0 in accordance with the invention, first time slot interchanger memory 12 and second time slot interchanger memory 14 may be read up to two times during a time slot. D-channel assembler 18 assembles the multiplexed DS0 using the communications signal data read out during these two memory accesses. At the end of the time slot, interface 22 receives the output of D-channel assembler 18 after it has passed through multiplexer 20. Interface 22 may latch the data in or pass it through to other circuitry. Multiplexer 20 will pass the output of D-channel assembler 18 to interface 22 when the time slot in question contains a multiplexed D-channel signal. Interface 22 may then send the data in either serial or parallel form to a central office interface or to the central office itself.

In this embodiment, each time slot in a frame for time slot interchanger 10 is associated with four source pointers stored in source pointer RAMs 28. Two source pointers per time slot may be stored in each source pointer RAM 28. Each source pointer in this embodiment is 15 bits wide. Thus, source pointer RAMs 28 each comprise a 4K by 15 memory.

Each source pointer comprises a series of address bits indicating the source address—11 bits in this example for a 2K by 2K time slot interchanger. The source pointer further comprises D-channel source bits (three bits in this embodiment) indicating which bit pair within a byte containing a D-channel signal contains the D-channel information. In other words, the invention allows the D-channel information to be placed in bits 0:1, 1:2, 2:3, 3:4, 4:5, 5:6, 6:7, or 7:0 of the DS0 signal received from a subscriber. This feature of the invention allows flexibility in designing interface circuitry for subscribers. The source pointer in this embodiment also includes a control bit indicating whether a particular byte to be read is a DS0 or a D-channel signal. This control bit may be used to control multiplexer 20 as well as D-channel assembler 18. Other bits could be included or some of the described bits omitted from the source pointer without departing from the scope of the invention.

For ordinary DS0s, time slot interchanger 10 may either read the same memory location of first time slot interchanger memory 12 twice during a particular time slot such that the first read of first time slot interchanger memory 12 is ignored and the second read is sent through multiplexer 20 to interface 22 at the appropriate time. Alternatively, control circuitry 34 could generate wait states for the clock driving first time slot interchanger memory 12. Wait states could be used to generate a single read of first time slot interchanger memory 12 during a time slot that contains an ordinary DS0. In either case, the data from time slot interchanger memory 12 may be transferred to interface 22 through multiplexer 20 at the end of the time slot. If the speed of the circuitry of interface 22 becomes a problem, then multiplexer 20 could latch the appropriate data at the end of a time slot.

For D-channel signals, the D-channel source bits of the source pointer specify the pair of consecutive bits (potentially including bit pair 7 and 0) where the D-channel information is located for a particular location. Time slot interchanger 10 causes the full 8 bits to be read from that memory location in either first time slot interchanger memory 12 or second time slot interchanger memory 14 and sent to D-channel assembler 18. Alternatively, control circuitry could be designed to cause only the relevant 2 bits to be read from first time slot interchanger memory 12 and/or second time slot interchanger memory 14.

Figure 2:
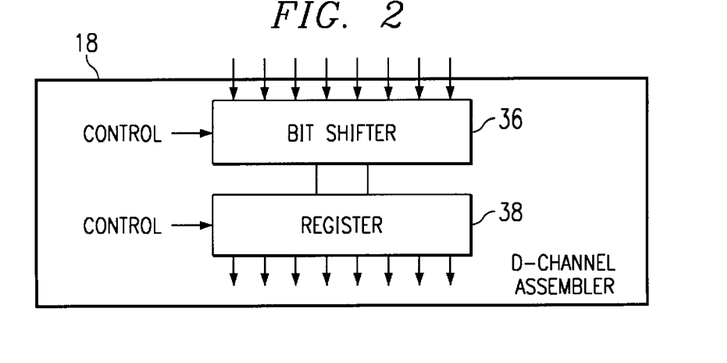
FIG. 2 illustrates an embodiment of a D-channel assembler that may be used in the time slot interchangers of FIGS. 1, 3, and 5.

FIG. 2 illustrates an example of a D-channel assembler 18 that can be used in time slot interchanger 10. Other D-channel assemblers 18 can also be used without departing from the scope of the invention. D-channel assembler 18 comprises bit shifter 36 and register 38. Bit shifter 36 shifts the selected bits indicated by the D-channel source pointer bits to the 2-bit output of bit shifter 36. Bit shifter 36 is capable of shifting any pair of consecutive bits (potentially including bit pair 7 and 0) to the output of bit shifter 36 based upon control signals it receives.

After the appropriate bits have been shifted to the output of bit shifter 36, register 38 latches the 2 bits into an appropriate position in register 38. In this embodiment, the circuitry controlling register 38 simply counts from 0 to 3 (denoting the four positions in a multiplexed DS0 signal) and places the 2-bit output of bit shifter 36 into consecutive positions in register 38. In other words, a time slot for time slot interchanger 10 can be broken up into four sub-time slots. During the first sub-time slot, a D-channel signal is received from first time slot interchanger memory 12, sent to bit shifter 36, and the output of bit shifter 36 is latched into the least significant 2 bits of register 38. During the second sub-time slot, a D-channel signal is read from second time slot interchanger memory 14, sent to bit shifter 36, and the output of bit shifter 36 is latched into the third and fourth bits of register 38. This process continues until an entire DS0 signal has been assembled at the end of the time slot. Alternatively, two additional bits could be added to the source pointer and control circuitry could cause the 2-bit output from bit shifter 36 to be placed into one of the four bit pair positions of register 38 based upon these two source pointer bits.

First time slot interchanger memory 12 and second time slot interchanger memory 14 could each be divided into a section for odd frames and a section for even frames as is commonly known in the art. This technique could be used with any of the embodiments discussed herein.

Focusing now on the processing of an entire frame, a frame of communication signals received from a subscriber interface is stored consecutively in first time slot interchanger memory 12 and second time slot interchanger memory 14. During a second frame period, these communication signals are read out of first time slot interchanger memory 12 and second time slot interchanger memory 14 in a random order in order to achieve an interchange of those signals. For a given time slot in the frame that is sent to the central office, interface 22 will either receive an ordinary DSO signal or a multiplexed signal comprising a plurality of multiplexed ISDN D-channel signals. Interface 22 receives the appropriate signals in the order dictated by the source pointers stored in source pointer RAMs 28.

Because first time slot interchanger memory 12 and second time slot interchanger memory 14 are being read twice as fast as they are being written, two sequential address counters 32 may be used for time slot interchanger 10. Alternatively, one sequential address counter 32 running fast enough for reading data from the memories could be used and the least significant bit of this counter could be ignored for purposes of writing data to first time slot interchanger memory 12 and second time slot interchanger memory 14.

Figure 3:
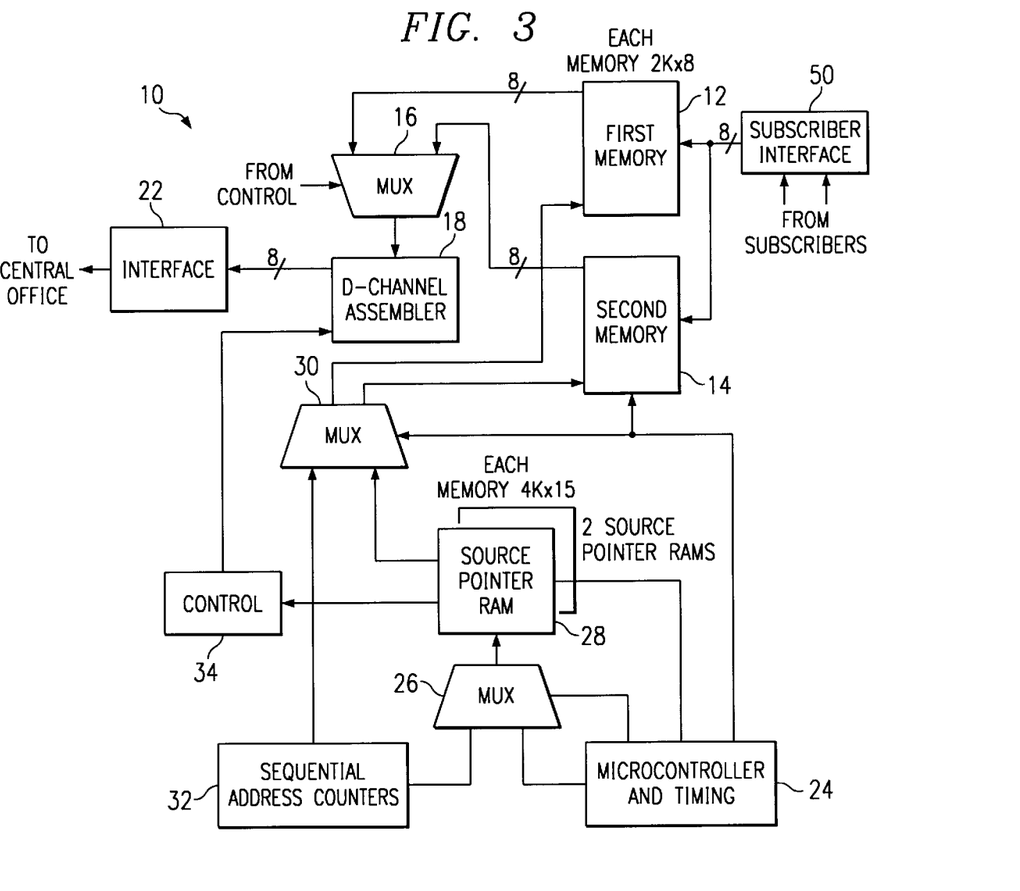
FIG. 3 illustrates a block diagram of a second embodiment of the time slot interchanger portion of a digital communications terminal constructed in accordance with the invention.

FIG. 3 illustrates a second embodiment of a time slot interchanger 10 that may be used in a digital communications terminal to multiplex ISDN D-channel signals into multiplexed signals in accordance with the invention. Time slot interchanger 10 of FIG. 3 differs from the embodiment illustrated in FIG. 1 in that the output of first time slot interchanger memory 12 is coupled to multiplexer 16, while multiplexer 20 is omitted. Ordinary DSO signals also pass through D-channel assembler 18. The differences between the embodiment of time slot interchanger 10 of FIG. 3 and the embodiment of FIG. 1 can best be understood by examining the operation of the embodiment illustrated in FIG. 3.

In the embodiment illustrated in FIG. 3, D-channel assembly takes place in the same manner as described for the embodiment illustrated in FIG. 1. Here, however, multiplexer 20 has been eliminated and the output of D-channel assembler 18 is sent to interface 22 at the end of a time slot. Ordinary DSO signals are handled differently than in the embodiment illustrated in FIG. 1. In this embodiment, each DSO is treated similarly to multiplexed D-channel signals. In order to send a DSO to the central office in a particular time slot, that DSO should be sent to interface 22 at the appropriate time. To accomplish this, the memory location in first time slot interchanger memory 12 containing the DSO received from the subscriber interface is read twice during the appropriate time slot. Similarly, the memory location in second time slot interchanger memory 14 containing that same DSO is also read twice during the appropriate time slot. D-channel assembler 18 treats the DSO as four pieces and reassembles the DSO. In other words, the first time that the memory location is read from first time slot interchanger memory 12, bits 0 and 1 are shifted to the output of bit shifter 36 in D-channel assembler 18 based upon the D-channel source bits from the source pointer. These bits are then latched into bits 0 and 1 of register 38. The first time that the memory location is read from second time slot interchanger memory 14, bits 2 and 3 are shifted to the output of bit shifter 36 and D-channel assembler 18 based upon the D-channel source bits from the source pointer. These bits are then latched into bits 2 and 3 of register 34. This process repeats itself for the second read of both first time slot interchanger memory 12 and second time slot interchanger memory 14 and bits 4 through 7 of register 34.

By building a DSO two bits at a time, a bit can be eliminated from each source pointer and the control circuitry simplified. The bit indicating whether the source pointer is for a DSO or D-channel signal is unnecessary with this embodiment. This simplification is achieved because ordinary DSOs are treated similarly to D-channel signals. Note that four source pointers, two for each of first time slot interchanger memory 12 and second time slot interchanger memory 14, should be used to access an ordinary DSO in the memories.

The variations for D-channel assembler 18 discussed above in connection with FIG. 1 may also be used in the embodiment of time slot interchanger 10 in FIG. 3. Similarly, further alternatives to the embodiment of D-channel assembler 18 illustrated in FIG. 2 could also be used.

Figure 4:
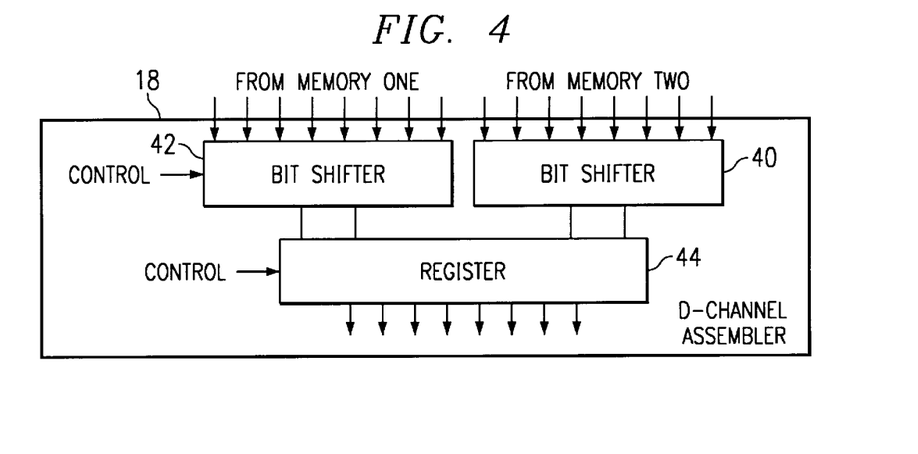
FIG. 4 illustrates a second embodiment of a D-channel assembler that may be used in the time slot interchangers of FIGS. 1, 3, and 5.
Figure 5:
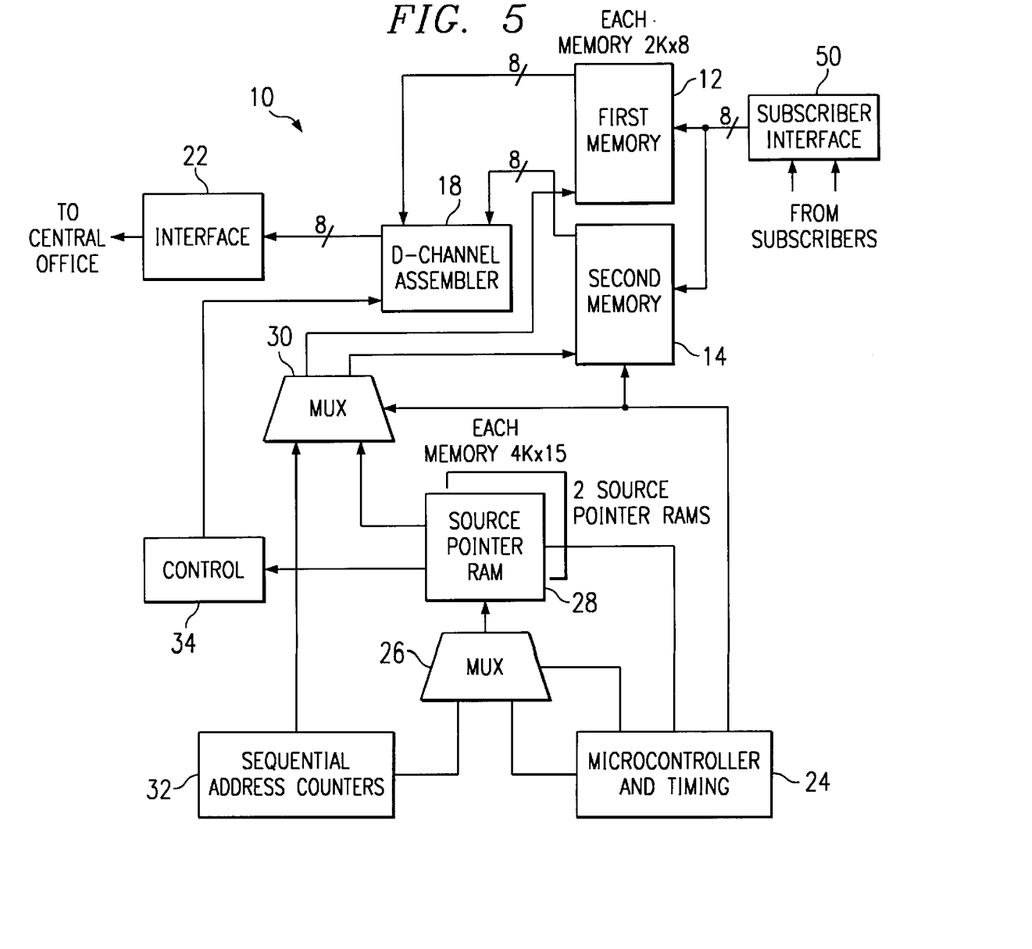
FIG. 5 illustrates a block diagram of a third embodiment of the time slot interchanger portion of a digital communications terminal constructed in accordance with the invention.

FIG. 4 illustrates an alternative embodiment of a D-channel assembler 18 that could be used in the time slot interchanger 10 of either FIGS. 1, 3 or 5. In this embodiment of D-channel assembler 18, register 44 is connected to a first bit shifter 42 and a second bit shifter 40. First bit shifter 42 receives its input from first time slot interchanger memory 12 while second bit shifter 40 receives its input from second time slot interchanger memory 14. The use of this embodiment of D-channel assembler 18 allows multiplexer 16 to be omitted from the embodiments of time slot interchanger 10 illustrated in FIGS. 1 and 3. Register 44 is similar to register 38 except that register 44 has been divided into two nibbles, an upper nibble and a lower nibble.

The upper nibble receives its input from first bit shifter 42 and the lower nibble receives its input from second bit shifter 40.

When assembling a multiplexed D-channel signal with the embodiment of D-channel assembler 18 illustrated in FIG. 4, first time slot interchanger memory 12 is used to retrieve up to two D-channel signals to be stored in the upper nibble of register 44 while second time slot interchanger memory 14 is used to retrieve up to two D-channel signals to be stored in the lower nibble of register 44. Thus, first time slot interchanger memory 12 and second time slot interchanger memory 14 may be read in parallel and first bit shifter 42 and second bit shifter 40 may shift data in parallel. Also, two D-channel signals may be simultaneously latched into register 44 in parallel. Using this embodiment of D-channel assembler 18 reduces the speed requirements of the bit shifter and register circuitry as compared to the embodiment of D-channel assembler 18 illustrated in FIG. 2. In addition, because first time slot interchanger memory 12 and second time slot interchanger memory 14 may be read in parallel, this embodiment of D-channel assembler 18 may also simplify timing by reducing the need to read the memories in a staggered fashion.

After the appropriate bits have been shifted to the outputs of first bit shifter 42 and second bit shifter 40, register 44 latches the 2 bits into an appropriate position in register 44. In this embodiment, the circuitry controlling register 44 simply counts from 0 to 1 (denoting either the low half or high half of each nibble of register 44) and places the 2-bit output of first bit shifter 42 into consecutive positions in the high nibble of register 44 and places the 2-bit output of bit shifter 40 into consecutive positions of the low-nibble of register 44. In other words, a time slot for time slot interchanger 10 can be broken into two sub-time slots. During the first sub-time slot, the output of first bit shifter 42 and second bit shifter 40 is latched into the least significant two bits of the high nibble and low nibble, respectively, of register 44. During the second sub-time slot, the output of first bit shifter 42 and second bit shifter 40 is latched into the upper 2 bits of the high nibble and low nibble, respectively, of register 44. Alternatively, an additional bit could be added to the source pointer and control circuitry could cause the 2-bit output from first bit shifter 42 and second bit shifter 40 to be placed into either the lower 2 bits or upper 2 bits of the high nibble and low nibble, respectively, of register 44.

FIG. 5 illustrates a third embodiment of a time slot interchanger 10 that may be used in a digital communications terminal to multiplex ISDN D-channel signals into multiplexed signals in accordance with the invention. Time slot interchanger 10 of FIG. 5 differs from the embodiments illustrated in FIGS. 1 and 3 in that the output of first time slot interchanger memory 12 is coupled to D-channel assembler 18 while multiplexers 16 and 20 have been omitted. Ordinary DSO signals also pass through D-channel assembler 18. The differences between the embodiment of time slot interchanger 10 of FIGS. 1 and 3 and the embodiment of FIG. 5 can best be understood by examining the operation of the embodiment illustrated in FIG. 5.

In the embodiment illustrated in FIG. 5, time slot interchanger 10 may include the embodiment of D-channel assembler 18 illustrated in FIG. 4. D-channel assembly takes place in the same manner as described in connection with FIG. 4. Here, however, multiplexer 16 and multiplexer 20 have been eliminated and the output of D-channel assembler 18 is sent to interface 22 at the end of the time slot. In this embodiment, each DSO is treated similarly to multiplexed D-channel signals. In order to send a DSO to the central office in a particular time slot, that DSO should be sent to interface 22 at the appropriate time. To accomplish this, the memory location in first time slot interchanger memory 12 and in second time slot interchanger memory 14 containing the DSO received from the subscriber interface is read twice from each memory during the appropriate time slot. D-channel assembler 18 treats the DSO as four pieces and reassembles the DSO. In other words, the first time that the memory location is read from first time slot interchanger memory and second time slot interchanger memory 14, bits 0 and 1 are shifted to the output of first bit shifter 42 in D-channel assembler 18 based upon the D-channel source bits from the source pointer. At the same time, the first time that the memory location in second time slot interchanger memory 14 is read, bits 4 and 5 are shifted to the output of second bit shifter 40 in D-channel assembler 18 based upon the D-channel source bits from the source pointer. These bits are then latched into bits 0 and 1 and 4 and 5 of register 44. Next, bits 2 and 3 are shifted to the output of second bit shifter 40 and bits 6 and 7 are shifted to the output of first bit shifter 42. These bits are then latched into the appropriate bits of register 44.

By building a DSO four bits at a time, a bit can be eliminated from each source pointer and the control circuitry simplified. The bit indicating whether the source pointer is for a DSO or D-channel signal is unnecessary with this embodiment. This simplification is achieved because ordinary DSOs are treated similarly to D-channel signals. Four source pointers, two for first time slot interchanger memory 12 and two for second time slot interchanger memory 14 with the same address should be used to access an ordinary DSO in these memories.

As an alternative to using the embodiment of D-channel assembler 18 illustrated in FIG. 4 in the time slot interchanger 10 illustrated in FIG. 5, first bit shifter 42 and second bit shifter 40 could be omitted from the D-channel assembler 18 illustrated in FIG. 4. In such an embodiment, the D-channel signals would be placed in the proper 2-bit position for output to interface 22 before they are even received by time slot interchanger 10. For example, the D-channel signals may be placed in the proper 2-bit position by ISDN line cards or by the subscriber interface of the digital communications terminal. The "proper 2-bit position" refers to the position of the D-channel signal after it has passed through time slot interchanger 10 and has been placed in a multiplexed DSO signal for transmission to the central office through interface 22. Line cards may be made programmable such that any ISDN D-channel signal can be placed into bits 0:1, 2:3, 4:5 or 6:7 of a DSO for transport to the digital communications terminal.

At time slot interchanger 10, a D-channel assembler may still be used to assemble four D-channels into a DSO signal, but because the D-channel signals are already in proper position within the byte, bit shifters 40 and 42 may be omitted in this embodiment of D-channel assembler 18. Instead, an 8-bit register 44 may be used. Register 44 may be controlled to read only four bits at a time, two for the lower nibble and two for the upper nibble of register 44. The source pointer for this embodiment may omit the D-channel source bits as the D-channel data bits already are in proper position for transmission to the central office when received by time slot interchanger memory 12 and time slot interchanger memory 14. Such an embodiment of time slot interchanger 18 could also be used with the embodiments of time slot interchanger 10 illustrated in FIGS. 1 and 3 without departing from the scope of the invention.

It should be understood that the term "control circuitry" is a broad term referring simply to circuitry used to control other circuitry. The term is broadly intended to include the direct use of bits from source pointer RAMs 28 to control time slot interchanger 10. The term, "latching," in this application is also used broadly to refer to the act of storing data for a period of time. The term refers to capturing of data whether components such as register 38 and register 44 actually latch data using a latching function, latch data using a flip flop type function, or latch data in some other manner.

One embodiment of the invention involves storing data bits of ISDN D-channel signals in first time slot interchanger memory 12 and in second time slot interchanger memory 14 in the same position that those signals will occupy within one of the multiplexed signals. The term "same position" refers to the position of data bits within first time slot interchanger memory 12 and second time slot interchanger memory 14 relative to other data bits. First time slot interchanger memory 12 and/or second time slot interchanger memory 14 could also include other bits such as error detection/correction bits without departing from the scope of the invention. The data bits of a D-channel signal could be placed in all four 2-bit positions in a DSO signal before being sent to time slot interchanger 10 through the subscriber interface. This alternative might simplify the implementation of time slot interchanger 10.

Although the invention is illustrated in the context of assembling D-channel signals from subscribers destined for a central office, the invention could be used at any point in a telecommunications system. For example, assembly could occur within a class V central office switch itself.

Although the present invention has been described in detail, it should be understood that various changes, substitutions, and alterations can be made hereto without departing from the spirit and scope of the invention as defined by the appended claims.

What is claimed is:

1. A time slot interchanger, comprising:
a first interface operable to receive a first frame of communication signals, wherein some of the communication signals represent ISDN D-channel signals, each ISDN D-channel signal represented by a first number of data bits and a second number of other bits;
a first memory coupled to the first interface and operable to store the first frame of communication signals during a first frame period;
a second memory coupled to the first interface and operable to store the first frame of communication signals during the first frame period;
control circuitry coupled to the first and second memories and operable to cause the first and second memories to output at least some of the stored communication signals during a second frame period;
a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and
a second interface coupled to the D-channel assembler and operable to transmit a second frame of communication signals, the second frame of communication signals including the multiplexed signals.

2. A time slot interchanger, comprising:
a first interface operable to receive a first frame of communication signals, wherein some of the communication signals represent ISDN D-channel signals, each ISDN D-channel signal represented by a first number of data bits and a second number of other bits;
a first memory coupled to the first interface and operable to store the first frame of communication signals during a first frame period;
a second memory coupled to the first interface and operable to store the first frame of communication signals during the first frame period;
control circuitry coupled to the first and second memories and operable to cause the first and second memories to output at least some of the stored communication signals during a second frame period;
a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and
a second interface coupled to the D-channel assembler and operable to transmit a second frame of communication signals, the second frame of communication signals including the multiplexed signals, wherein the D-channel assembler further comprises:
a shifter coupled to the first and second memories and controlled by the control circuitry, the shifter operable to receive an output communication signal and produce a shifter output comprising two selected bits of the output communication signal, wherein the two selected bits are selected in response to one or more bits of a source pointer associated with the memory location and memory from which the output communication signal was output;
a register coupled to the shifter and controlled by the control circuitry, the register operable to receive the shifter output and assemble multiplexed signals by sequentially latching each of a plurality of shifter outputs into one of a plurality of subchannels of the register.

3. A time slot interchanger, comprising:
a first interface operable to receive a first frame of communication signals, wherein some of the communication signals represent ISDN D-channel signals, each ISDN D-channel signal represented by a first number of data bits and a second number of other bits;
a first memory coupled to the first interface and operable to store the first frame of communication signals during a first frame period;
a second memory coupled to the first interface and operable to store the first frame of communication signals during the first frame period;
control circuitry coupled to the first and second memories and operable to cause the first and second memories to output at least some of the stored communication signals during a second frame period;
a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and
a second interface coupled to the D-channel assembler and operable to transmit a second frame of communication signals, the second frame of communication signals including the multiplexed signals, wherein the D-channel assembler further comprises:
a first shifter coupled to the first memory and controlled by the control circuitry, the first shifter operable to receive a first output communication signal from the first memory and produce a first shifter output comprising two selected bits of the first output communication signal, wherein the two selected bits are selected in response to one or more bits of a source pointer associated with the first memory and the location within the first memory from which the first output communication signal was output;
a second shifter coupled to the second memory and controlled by the control circuitry, the second shifter operable to receive a second output communication signal from the second memory and produce a second shifter output comprising two selected bits of the second output communication signal, wherein the two selected bits are selected in response to one or more bits of a source pointer associated with the second memory and the location within the second memory from which the second output communication signal was output;
a register coupled to the first and second shifters and controlled by the control circuitry, the register operable to receive the first and second shifter outputs and assemble multiplexed signals by latching one or more first shifter outputs into one of a plurality of subchannels of the register and one or more second shifter outputs into one of a plurality of subchannels of the register.

4. A time slot interchanger, comprising:

a first interface operable to receive a first frame of communication signals, wherein some of the communication signals represent ISDN D-channel signals, each ISDN D-channel signal represented by a first number of data bits and a second number of other bits;

a first memory coupled to the first interface and operable to store the first frame of communication signals during a first frame period;

a second memory coupled to the first interface and operable to store the first frame of communication signals during the first frame period;

control circuitry coupled to the first and second memories and operable to cause the first and second memories to output at least some of the stored communication signals during a second frame period;

a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and a second interface coupled to the D-channel assembler and operable to transmit a second frame of communication signals, the second frame of communication signals including the multiplexed signals, wherein the first number of data bits of each communication signal received by the first interface that represent an ISDN D-channel signal are positioned within the first and second memories such that those bits will occupy the same position within one of the multiplexed signals; and wherein the D-channel assembler further comprises a register coupled to the first memory and second memory and controlled by the control circuitry, the register operable to receive a first output communication signal from the first memory and a second output communication signal from the second memory and assemble multiplexed signals by latching selected data bits from at least the first output communication signal into one of a plurality of subchannels of the register and by latching selected data bits from at least the second output communication signal into one of the plurality of subchannels of the register.

5. The time slot interchanger of claim 1, further comprising:

a multiplexer having a first input, a second input, and an output and controlled by the control circuitry, the first input coupled to the first memory, the second input coupled to the D-channel assembler, and the output coupled to the second interface, the multiplexer operable to select the first input or second input in response to one or more bits of a source pointer.

6. A time slot interchanger, comprising:

a first interface operable to receive a first frame of communication signals, wherein some of the communication signals represent ISDN D-channel signals, each ISDN D-channel signal represented by a first number of data bits and a second number of other bits;

a first memory coupled to the first interface and operable to store the first frame of communication signals during a first frame period;

a second memory coupled to the first interface and operable to store the first frame of communication signals during the first frame period;

control circuitry coupled to the first and second memories and operable to cause the first and second memories to output at least some of the stored communication signals during a second frame period;

a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories;

a second interface coupled to the D-channel assembler and operable to transmit a second frame of communication signals, the second frame of communication signals including the multiplexed signals;

a multiplexer having a first input, a second input, and an output and controlled by the control circuitry, the first input coupled to the first memory, the second input coupled to the D-channel assembler, and the output coupled to the second interface, the multiplexer operable to select the first input or second input in response to one or more bits of a source pointer, wherein the D-channel assembler further comprises:

a first shifter coupled to the first memory and controlled by the control circuitry, the first shifter operable to receive a first output communication signal from the first memory and produce a first shifter output comprising two selected bits of the first output communication signal, wherein the two selected bits are selected in response to one or more bits of a source pointer associated with the first memory and the location within the first memory from which the first output communication signal was output;

a second shifter coupled to the second memory and controlled by the control circuitry, the second shifter operable to receive a second output communication signal from the second memory and produce a second shifter output comprising two selected bits of the second output communication signal, wherein the two selected bits are selected in response to one or more bits of a source pointer associated with the second memory and the location within the second memory from which the second output communication signal was output;

a register coupled to the first and second shifters and controlled by the control circuitry, the register operable to receive the first and second shifter outputs and assemble multiplexed signals by latching one or more first shifter outputs into one of a plurality of subchannels of the register and one or more second shifter outputs into one of a plurality of subchannels of the register.

7. A time slot interchanger, comprising:

a first interface operable to receive a first frame of communication signals, wherein some of the communication signals represent ISDN D-channel signals, each ISDN D-channel signal represented by a first number of data bits and a second number of other bits;

a first memory coupled to the first interface and operable to store the first frame of communication signals during a first frame period;

a second memory coupled to the first interface and operable to store the first frame of communication signals during the first frame period;

control circuitry coupled to the first and second memories and operable to cause the first and second memories to output at least some of the stored communication signals during a second frame period;

a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories;

a second interface coupled to the D-channel assembler and operable to transmit a second frame of communication signals, the second frame of communication signals including the multiplexed signals;

a multiplexer having a first input, a second input, and an output and controlled by the control circuitry, the first input coupled to the first memory, the second input coupled to the D-channel assembler, and the output coupled to the second interface, the multiplexer operable to select the first input or second input in response to one or more bits of a source pointer, wherein the first number of data bits of each communication signal received by the first interface that represent an ISDN D-channel signal are positioned within the first and second memories such that those bits will occupy the same position within one of the multiplexed signals; and wherein the D-channel assembler further comprises a register coupled to the first memory and second memory and controlled by the control circuitry, the register operable to receive a first output communication signal from the first memory and a second output communication signal from the second memory and assemble multiplexed signals by latching selected data bits from at least the first output communication signal into one of a plurality of subchannels of the register and by latching selected data bits from at least the second output communication signal into one of the plurality of subchannels of the register.

8. The time slot interchanger of claim 1, wherein the D-channel assembler receives all of the output communication signals, the D-channel assembler further operable to assemble DSO signals, each DSO signal assembled by receiving an output communication signal twice from the first memory and twice from the second memory and selecting and storing a unique pair of bits of the output communication signal each of the four times it is received.

9. A time slot interchanger, comprising:

a first interface operable to receive a first frame of communication signals, wherein some of the communication signals represent ISDN D-channel signals, each ISDN D-channel signal represented by a first number of data bits and a second number of other bits;

a first memory coupled to the first interface and operable to store the first frame of communication signals during a first frame period;

a second memory coupled to the first interface and operable to store the first frame of communication signals during the first frame period;

control circuitry coupled to the first and second memories and operable to cause the first and second memories to output at least some of the stored communication signals during a second frame period;

a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and a second interface coupled to the D-channel assembler and operable to transmit a second frame of communication signals, the second frame of communication signals including the multiplexed signals, wherein the D-channel assembler receives all of the output communication signals, the D-channel assembler further operable to assemble DSO signals, each DSO signal assembled by receiving an output communication signal twice from the first memory and twice from the second memory and selecting and storing a unique pair of bits of the output communication signal each of the four times it is received, wherein the D-channel assembler further comprises:

a first shifter coupled to the first memory and controlled by the control circuitry, the first shifter operable to receive a first output communication signal from the first memory and produce a first shifter output comprising two selected bits of the first output communication signal, wherein the two selected bits are selected in response to one or more bits of a source pointer associated with the first memory and the location within the first memory from which the first output communication signal was output;

a second shifter coupled to the second memory and controlled by the control circuitry, the second shifter operable to receive a second output communication signal from the second memory and produce a second shifter output comprising two selected bits of the second output communication signal, wherein the two selected bits are selected in response to one or more bits of a source pointer associated with the second memory and the location within the second memory from which the second output communication signal was output;

a register coupled to the first and second shifters and controlled by the control circuitry, the register operable to receive the first and second shifter outputs and assemble multiplexed signals by latching one or more first shifter outputs into one of a plurality of subchannels of the register and one or more second shifter outputs into one of a plurality of subchannels of the register.

10. A time slot interchanger, comprising:

a first interface operable to receive a first frame of communication signals, wherein some of the communication signals represent ISDN D-channel signals, each ISDN D-channel signal represented by a first number of data bits and a second number of other bits;

a first memory coupled to the first interface and operable to store the first frame of communication signals during a first frame period;

a second memory coupled to the first interface and operable to store the first frame of communication signals during the first frame period;

control circuitry coupled to the first and second memories and operable to cause the first and second memories to output at least some of the stored communication signals during a second frame period;

a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and a second interface coupled to the D-channel assembler and operable to transmit a second frame of communication signals, the second frame of communication signals including the multiplexed signals, wherein the D-channel assembler receives all of the output communication signals, the D-channel assembler further operable to assemble DSO signals, each DSO signal assembled by receiving an output communication signal twice from the first memory and twice from the second memory and selecting and storing a unique pair of bits of the output communication signal each of the four times it is received, wherein the first number of data bits of each communication signal received by the first interface that represent an ISDN D-channel signal are positioned within the first and second memories such that those bits will occupy the same position within one of the multiplexed signals; and wherein the D-channel assembler further comprises a register coupled to the first memory and second memory and controlled by the control circuitry, the register operable to receive a first output communication signal from the first memory and a second output communication signal from the second memory and assemble multiplexed signals by latching selected data bits from at least the first output communication signal into one of a plurality of subchannels of the register and by latching selected data bits from at least the second output communication signal into one of the plurality of subchannels of the register.

11. A digital communications terminal, comprising:

a subscriber link;

a central office link;

a time slot interchanger, including:

a first time slot interchanger interface coupled to the subscriber link and operable to receive a first frame of communication signals, wherein some of the communication signals represent ISDN D-channel signals, each ISDN D-channel signal represented by a first number of data bits and a second number of other bits;

a first memory coupled to the first time slot interchanger interface and operable to store the first frame of communication signals during a first frame period;

a second memory coupled to the first time slot interchanger interface and operable to store the first frame of communication signals during the first frame period;

control circuitry coupled to the first and second memories and operable to cause the first and second memories to output at least some of the stored communication signals during a second frame period;

a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and a second time slot interchanger interface coupled to the D-channel assembler and the central office link and operable to transmit a second frame of communication signals, the second frame of communication signals including the multiplexed signals.

12. A digital communications terminal, comprising:

a subscriber link;

a central office link;

a time slot interchanger, including:

a first time slot interchanger interface coupled to the subscriber link and operable to receive a first frame of communication signals, wherein some of the communication signals represent ISDN D-channel signals, each ISDN D-channel signal represented by a first number of data bits and a second number of other bits;

a first memory coupled to the first time slot interchanger interface and operable to store the first frame of communication signals during a first frame period;

a second memory coupled to the first time slot interchanger interface and operable to store the first frame of communication signals during the first frame period;

control circuitry coupled to the first and second memories and operable to cause the first and second memories to output at least some of the stored communication signals during a second frame period;

a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and a second time slot interchanger interface coupled to the D-channel assembler and the central office link and operable to transmit a second frame of communication signals, the second frame of communication signals including the multiplexed signals, wherein the D-channel assembler further comprises:

a first shifter coupled to the first memory and controlled by the control circuitry, the first shifter operable to receive a first output communication signal from the first memory and produce a first shifter output comprising two selected bits of the first output communication signal, wherein the two selected bits are selected in response to one or more bits of a source pointer associated with the first memory and the location within the first memory from which the first output communication signal was output;

a second shifter coupled to the second memory and controlled by the control circuitry, the second shifter operable to receive a second output communication signal from the second memory and produce a second shifter output comprising two selected bits of the second output communication signal, wherein the two selected bits are selected in response to one or more bits of a source pointer associated with the second memory and the location within the second memory from which the second output communication signal was output;

a register coupled to the first and second shifters and controlled by the control circuitry, the register operable to receive the first and second shifter outputs and assemble multiplexed signals by latching one or more first shifter outputs into one of a plurality of subchannels of the register and one or more second shifter outputs into one of a plurality of subchannels of the register.

13. A digital communications terminal, comprising:
a subscriber link;
a central office link;
a time slot interchanger, including:
  a first time slot interchanger interface coupled to the subscriber link and operable to receive a first frame of communication signals, wherein some of the communication signals represent ISDN D-channel signals, each ISDN D-channel signal represented by a first number of data bits and a second number of other bits;
  a first memory coupled to the first time slot interchanger interface and operable to store the first frame of communication signals during a first frame period;
  a second memory coupled to the first time slot interchanger interface and operable to store the first frame of communication signals during the first frame period;
  control circuitry coupled to the first and second memories and operable to cause the first and second memories to output at least some of the stored communication signals during a second frame period;
  a D-channel assembler coupled to the first and second memories and controlled by the control circuitry and operable to selectively receive at least some of the output communication signals from one of the first and second memories as determined by the control circuitry, the D-channel assembler operable to assemble multiplexed signals, at least one multiplexed signal comprising a multiplexed combination of the data bits of ISDN D-channel signals output by the first and second memories; and
a second time slot interchanger interface coupled to the D-channel assembler and the central office link and operable to transmit a second frame of communication signals, the second frame of communication signals including the multiplexed signals, wherein the first number of data bits of each communication signal received by the first interface that represent an ISDN D-channel signal are positioned within the first and second memories such that those bits will occupy the same position within one of the multiplexed signals; and wherein the D-channel assembler further comprises a register coupled to the first memory and second memory and controlled by the control circuitry, the register operable to receive a first output communication signal from the first memory and a second output communication signal from the second memory and assemble multiplexed signals by latching selected data bits from at least the first output communication signal into one of a plurality of subchannels of the register and by latching selected data bits from at least the second output communication signal into one of the plurality of subchannels of the register.

14. The digital communications terminal of claim 11, further comprising:
a multiplexer having a first input, a second input, and an output and controlled by the control circuitry, the first input coupled to the first memory, the second input coupled to the D-channel assembler, and the output coupled to the second interface, the multiplexer operable to select the first input or second input in response to one or more bits of a source pointer.

15. The digital communications terminal of claim 11, wherein the D-channel assembler receives all of the output communication signals, the D-channel assembler further operable to assemble DSO signals, each DSO signal assembled by receiving an output communication signal twice from the first memory and twice from the second memory and selecting and storing a unique pair of bits of the DSO-type output communication signal each of the four times it is received.

16. A method for multiplexing ISDN D-channel signals into multiplexed signals, comprising:
  receiving a frame of communication signals, wherein some of the communication signals represent ISDN D-channel signals, each ISDN D-channel signal represented by a first number of data bits and a second number of other bits;
  storing a first copy of the frame of communication signals in a first memory during a first frame period;
  storing a second copy of the frame of communication signals in a second memory during the first frame period;
  retrieving at least some of the stored communication signals from the first memory during a second frame period;
  retrieving at least some of the stored communication signals from the second memory during a second frame period;
  selecting communications signals retrieved from the first and second memories in response to a control signal; and
  assembling multiplexed signals, at least one multiplexed signal comprising a multiplexed combination of the data bits of ISDN D-channel signals retrieved from the first and second memories.

17. A method for multiplexing ISDN D-channel signals into multiplexed signals, comprising:
  receiving a frame of communication signals, wherein some of the communication signals represent ISDN-D-channel signals, each ISDN D-channel signal represented by a first number of data bits and a second number of other bits;
  storing a first copy of the frame of communication signals in a first memory during a first frame period;
  storing a second copy of the frame of communication signals in a second memory during the first frame period;

retrieving at least some of the stored communication signals from the first memory during a second frame period;

retrieving at least some of the stored communication signals from the second memory during a second frame period;

selecting communications signals retrieved from the first and second memories in response to a control signal; and assembling multiplexed signals, at least one multiplexed signal comprising a multiplexed combination of the data bits of ISDN D-channel signals retrieved from the first and second memories, wherein the multiplexed signals are assembled using a D-channel assembler comprising:

a shifter coupled to the first and second memories and controlled by control circuitry, the shifter operable to receive a retrieved communication signal and produce a shifter output comprising two selected bits of the retrieved communication signal, wherein the two selected bits are selected in response to one or more bits of a source pointer associated with the memory location and memory from which the retrieved communication signal was retrieved;

a register coupled to the shifter and controlled by the control circuitry, the register operable to receive the shifter output and assemble multiplexed signals by sequentially latching each of a plurality of shifter outputs into one of a plurality of subchannels of the register.

18. A method for multiplexing ISDN D-channel signals into multiplexed signals, comprising:

receiving a frame of communication signals, wherein some of the communication signals represent ISDN-D-channel signals, each ISDN D-channel signal represented by a first number of data bits and a second number of other bits;

storing a first copy of the frame of communication signals in a first memory during a first frame period;

storing a second copy of the frame of communication signals in a second memory during the first frame period;

retrieving at least some of the stored communication signals from the first memory during a second frame period;

retrieving at least some of the stored communication signals from the second memory during a second frame period;

selecting communications signals retrieved from the first and second memories in response to a control signal; and assembling multiplexed signals, at least one multiplexed signal comprising a multiplexed combination of the data bits of ISDN D-channel signals retrieved from the first and second memories, wherein the multiplexed signals are assembled using a D-channel assembler comprising:

a first shifter coupled to the first memory and controlled by control circuitry, the first shifter operable to receive a first retrieved communication signal from the first memory and produce a first shifter output comprising two selected bits of the first retrieved communication signal, wherein the two selected bits are selected in response to one or more bits of a source pointer associated with the first memory and the location within the first memory from which the first retrieved communication signal was retrieved;

a second shifter coupled to the second memory and controlled by the control circuitry, the second shifter operable to receive a second retrieved communication signal from the second memory and produce a second shifter output comprising two selected bits of the second retrieved communication signal, wherein the two selected bits are selected in response to one or more bits of a source pointer associated with the second memory and the location within the second memory from which the second retrieved communication signal was retrieved;

a register coupled to the first and second shifters and controlled by the control circuitry, the register operable to receive the first and second shifter outputs and assemble multiplexed signals by latching one or more first shifter outputs into one of a plurality of subchannels of the register and one or more second shifter outputs into one of a plurality of subchannels of the register.

19. A method for multiplexing ISDN D-channel signals into multiplexed signals, comprising:

receiving a frame of communication signals, wherein some of the communication signals represent ISDN-D-channel signals, each ISDN D-channel signal represented by a first number of data bits and a second number of other bits;

storing a first copy of the frame of communication signals in a first memory during a first frame period;

storing a second copy of the frame of communication signals in a second memory during the first frame period;

retrieving at least some of the stored communication signals from the first memory during a second frame period;

retrieving at least some of the stored communication signals from the second memory during a second frame period;

selecting communications signals retrieved from the first and second memories in response to a control signal; and assembling multiplexed signals, at least one multiplexed signal comprising a multiplexed combination of the data bits of ISDN D-channel signals retrieved from the first and second memories, wherein for each received communication signal that represents an ISDN D-channel signal, the first number of data bits are positioned within the first and second memories such that those bits will occupy the same position within one of the multiplexed signals;

wherein the multiplexed signals are assembled using a D-channel assembler, comprising a register coupled to the first memory and second memory and controlled by control circuitry, the register operable to receive a first retrieved communication signal from the first memory and a second retrieved communication signal from the second memory and assemble multiplexed signals by latching selected data bits from at least the first retrieved communication signal into one of a plurality of subchannels of the register and by latching selected data bits from at least the second retrieved communication signal into one of the plurality of subchannels of the register.

20. The method of claim 16, wherein the multiplexed signals are assembled using a D-channel assembler; the method further comprising:

multiplexing the output of the D-channel assembler and the output of the first memory in response to a source pointer to produce a selected output.

21. The method of claim 16, further comprising:

assembling DS0 signals, each DS0 signal assembled by retrieving a communication signal twice from the first memory and twice from the second memory and selecting and storing a unique pair of bits of the communication signal each of the four times it is retrieved.

22. The method of claim 16, wherein the assembly of a multiplexed signal takes place during a single time slot of a frame period.

23. The method of claim 16, wherein the first number equals the second number.

* * * * *